United States Patent
Talat et al.

(10) Patent No.: US 9,674,099 B2
(45) Date of Patent: Jun. 6, 2017

(54) NETWORK CLASSIFICATION FOR APPLICATIONS

(71) Applicant: Microsoft Corporation, Redmond, WA (US)

(72) Inventors: Ahmed Talat, Seattle, WA (US); Vibhor Bhatt, Seattle, WA (US); Jeff Sinnemaki, Seattle, WA (US); Alexei Aleksenko, Seattle, WA (US); Ilia Sacson, Seattle, WA (US); Jeffrey C. Fuller, Seattle, WA (US); Milena Salman, Seattle, WA (US); Madhusudhan Ravi, Seattle, WA (US); Mohammed Karam, Seattle, WA (US); Neel Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 14/497,315

(22) Filed: Sep. 25, 2014

(65) Prior Publication Data
US 2016/0094464 A1    Mar. 31, 2016

(51) Int. Cl.
*H04L 12/851* (2013.01)
*H04L 12/859* (2013.01)
(Continued)

(52) U.S. Cl.
CPC ........ *H04L 47/2441* (2013.01); *G06F 9/5083* (2013.01); *H04L 47/2475* (2013.01); *H04L 65/80* (2013.01)

(58) Field of Classification Search
CPC . H04L 47/2441; H04L 47/2475; H04L 65/80; H04L 43/0882; H04L 43/0888; H04L 45/126; H04L 45/18; H04L 45/302; H04L 45/306; H04L 47/25; H04L 47/30; H04L 47/564; H04L 47/626; H04L 47/6275; H04L 47/6285; H04L 47/629; H04L 47/762; G06F 9/5083
(Continued)

(56) References Cited

U.S. PATENT DOCUMENTS

| 7,895,353 B2 | 2/2011 | Jansson |
| 8,045,458 B2 | 10/2011 | Alperovitch et al. |

(Continued)

FOREIGN PATENT DOCUMENTS

EP    1096742 A1    5/2001

OTHER PUBLICATIONS

International Search Report and Written Opinion for Application PCTAJS2015/051951, mailed Dec. 21, 2015.
(Continued)

*Primary Examiner* — David Lazaro
*Assistant Examiner* — Berhanu Shitayewoldetadik (57) ABSTRACT

An operating system implements classes of network streams. Applications assign their network streams to the classes. The operating system, in turn, regulates the streams according to which classes the streams are in. As conditions change, network resources may be made available or more fully utilized by regulating streams according to which classes they have been assigned to. Network resources may be made available, perhaps rapidly or preemptively, for streams in higher priority classes by restricting streams in lower priority classes.

20 Claims, 10 Drawing Sheets

(51) Int. Cl.
*H04L 29/06* (2006.01)
*G06F 9/50* (2006.01)

(58) Field of Classification Search
USPC ................................ 709/219, 227, 235, 245
See application file for complete search history.

(56) References Cited

U.S. PATENT DOCUMENTS

| | | | |
|---|---|---|---|
| 8,255,536 | B2 | 8/2012 | Chen |
| 2003/0152096 | A1* | 8/2003 | Chapman ............ H04L 12/5695 370/412 |
| 2004/0039939 | A1* | 2/2004 | Cox .................... H04L 63/0263 709/224 |
| 2004/0215811 | A1* | 10/2004 | Bar ...................... H04L 67/322 709/232 |
| 2006/0019679 | A1* | 1/2006 | Rappaport ............ H04W 64/00 455/456.5 |
| 2008/0089237 | A1 | 4/2008 | Molen et al. |
| 2010/0010974 | A1 | 1/2010 | Chieu et al. |
| 2010/0178031 | A1* | 7/2010 | Kim ........................ H04N 5/76 386/291 |
| 2011/0276699 | A1 | 11/2011 | Pedersen |
| 2012/0039332 | A1 | 2/2012 | Jackowski et al. |
| 2013/0077486 | A1 | 3/2013 | Keith |
| 2013/0132604 | A1* | 5/2013 | Cohen ................. H04W 76/025 709/231 |
| 2013/0346568 | A1 | 12/2013 | Forsman et al. |
| 2014/0105082 | A1 | 4/2014 | Sinha |

OTHER PUBLICATIONS

Posey, Brien M., QoS in Windows Server 2012 (part 1), http://www.windowsnetworking.com/articles-tutorials/windows-server-2012/QoS-Windows-Server-2012-Part1.html, 4 pages, Aug. 30, 2012.
Posey, Brien M., QoS in Windows Server 2012 (part 2), http://www.windowsnetworking.com/articles-tutorials/windows-server-2012/QoS-Windows-Server-2012-Part2.html, 5 pages, Aug. 27, 2012.
Posey, Brien M., QoS in Windows Server 2012 (part 3), http://www.windowsnetworking.com/articles-tutorials/windows-server-2012/QoS-Windows-Server-2012-Part3.html, 8 pages, Oct. 23, 2012.
Collins, Andrew, "Maximizing Network Performance with Quality of Service (QoS)", Published on: Apr. 26, 2012, Available at: http://cradlepoint.com/about/blog/maximizing-network-performance-quality-service-qos.
"Optimizing Carrier Ethernet Latency & Bandwidth Efficiency", In White Paper, Jan. 2010, 8 pages.
Shalunov, et al., "Low Extra Delay Background Transport (LEDBAT)", In Draft of Internet Engineering Task Force, Dec. 2012, 25 pages.
International Search Report, Application PCT/US2015/051953, mailed Jan. 14, 2016.
"Second Written Opinion Issued in PCT Application No. PCT/US2015/051953", Mailed Date: Dec. 15, 2016, 7 Pages.
"International Preliminary Report on Patentability Issued in PCT Application No. PCT/US2015/051953", Mailed Date: Mar. 10, 2017, 8 Pages.

* cited by examiner

FIG. 3 streams

| ID | (IP 5-tuple) | class |
|---|---|---|
| 1 | (IP1, port1, IP3, port2, Protocol1) | A |
| 2 | (IP1, port3, IP5, port4, Protocol2) | C |
| 3 | (IP1, port14, IP6, port5, Protocol4) | A |
| 5 | (IP1, port6, IP7, port8, Protocol5) | - |
| 6 | (IP2, port2, IP10, port4, Protocol3) | D |
| 7 | (IP2, port1, IP10, port9, Protocol1) | B |
| 8 | (IP2, port7, IP14, port11, Protocol6) | - |
| 9 | (IP2, port15, IP20, port13, Protocol3) | D |
| ... | ... | ... |

NETWORK CLASSIFICATION FOR APPLICATIONS

RELATED APPLICATIONS

This application is related to U.S. patent application Ser. No. 14/497,313, titled "MANAGING CLASSIFIED NETWORK STREAMS", filed Sep. 25, 2014, which is incorporated herein by reference.

BACKGROUND

When multiple applications on a computing device share the same limited network resources on or external to the computing device, various techniques have been used to attempt to balance the networking needs of those applications. Computer users and applications usually prefer certain trade-offs and prioritizations among applications consuming network resources. However, in practice, prior techniques for sharing network access often have not optimally realized those preferences and priorities. For example, a user of a device may prefer that Voice over IP (VoIP) calls on their device have low network latency and that web browsing on the device be snappy and responsive. The user also may prefer that background bulk network transfers, such as cloud synchronizations and operating system updates, yield their consumption of the device's network resources in a way that enables satisfactory foreground performance and maintains reasonable progress.

In addition to often failing to satisfactorily share network access, prior access-sharing techniques have often not been convenient for software developers to access or implement. For example, while Quality of Service (QoS) facilities can be helpful, they are often not available or are not implemented in a uniform manner. Most QoS technology occurs below the application level and therefore may not be reliably manipulable by applications. Most QoS approaches, Differentiated Services for instance, depend on the behavior and support of the network between two endpoints. Such support may not exist on all network paths. Regarding convenience, network sharing behavior has also been implemented within applications, but this has usually required complex network programming with little or no direct coordination between applications. Not only is it duplicative for different applications to implement their own network-sharing logic, but the different resource-sharing behaviors of applications may conflict.

While there are protocols such as LEDBAT (Low Extra Delay Background Transport) that are implemented by operating systems to allow applications to implement specific types of network-consuming behavior, coding to leverage such a protocol may increase the cost and overhead of developing an application and may make a developer less likely to use such a protocol. In addition, widely deployed low-priority TCP (Transport Control Protocol) mechanisms like LEDBAT have shortcomings and often do not provide an ideal user experience (see Internet Engineering Task Force Request for Comments 6297 for other examples). The LEDBAT protocol, for instance, only restricts TCP send windows and has no effect on the receive stream, yet most client-side Internet traffic is inbound. Even when a mechanism like LEDBAT is available without requiring complex developer coding, it may not be possible for an operating system or network stack to determine that an application should use such a mechanism. In other words, user and application intent regarding network resource conflicts has been difficult to infer and applications have rarely specified their network priorities. Nor has sharing of a device's network resources been implemented in a way that is consistent among competing applications without being susceptible to problems such as the "latecomer" phenomena (e.g., see Request For Comments 681 7, section 4.4).

Techniques related to convenient and effective sharing of a device's network resources are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

An operating system implements classes of network streams. Applications assign their network streams to the classes. The operating system, in turn, regulates the streams according to which classes the streams are in. As conditions change, network resources may be made available or more fully utilized by regulating streams according to which classes they have been assigned to. Network resources may be made available, perhaps rapidly or preemptively, for streams in higher priority classes by restricting streams in lower priority classes.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to allowing applications to classify their network streams to a network stack or operating system, which in turn orchestrates sharing of a device's network resources in a system-wide fashion according to the classifications of the network streams. Discussion will begin with a system overview and explanation of how applications can select how the system will regulate their network behavior. Examples of network stream classification models and details for implementing same will be described next.

Figure 1:
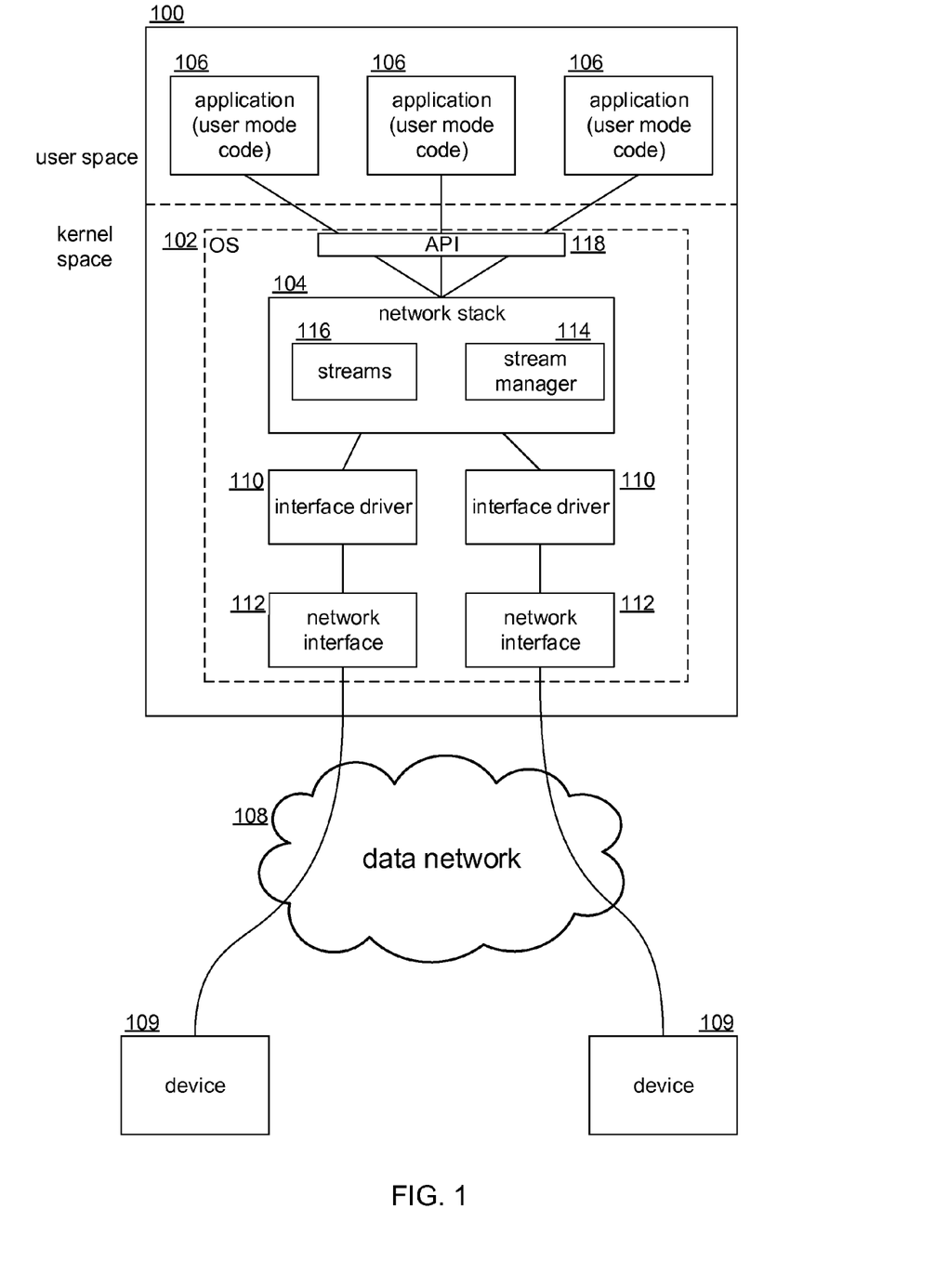
FIG. 1 shows a computing device with an operating system that implements a network stack.

FIG. 1 shows a computing device 100 with an operating system 102 that implements a network stack 104. The network stack 104 may be derived from any known operating system networking stack, with additions or changes apparent from this description. For example, a TCP/IP network stack may be modified or augmented with a wrapper. Generally, implementation at the transport level of any network protocol stack will be convenient. On the computing device 100, any of a variety of arbitrary applications 106 may be executing and communicating through a data network 108. Some examples of applications 106 are web browsers, background downloaders, online games, realtime voice or video communication programs, database clients, media streaming applications, etc. To exchange data with remote devices 109, the applications 106 communicate through the data network 108, which may be a network carrying IP (Internet Protocol) traffic or variants thereof. In cases where a virtualization layer (e.g., a hypervisor) is present and applications execute on guest operating systems on different virtual machines, network communication may be fully or partly local to the computing device 100.

The operating system 102 may include one or more interface drivers 110 (device drivers) that, among other known functions, pass packets to, and receive packets from, respective network interfaces 112. It may be assumed that the applications 106 execute in user space and the operating system 102 and networking features described herein execute in kernel space. However, this is not a requirement. Kernel mode code or user mode code may assign network classifications to network streams controlled thereby, and a stream manager 114 may execute in kernel space or user space. In one embodiment, network stream management may be implemented with a user mode wrapper that exchanges packets with a known TCP/IP network stack.

The stream manager 114 manages and regulates network streams 116 for the applications 106. Network streams 116 (referred to hereafter as "streams") are operating system objects that correspond to respective network connections (e.g., IP 5-tuples) between the computing device 100 and the remote devices 109. Typically, each stream has a FIFO buffer and a descriptor or handle used by the operating system and the stream's application to identify the stream when performing operations on the stream. The network stack 104 may provide a transport-layer module (e.g., a TCP module) that implements a transport protocol on behalf of the streams 116. The operating system 102 provides an application programming interface (API) 118 that applications 106 use to perform stream related operations such as instantiating a stream object, setting stream parameters, initiating a network connection with a stream, closing the stream, getting and setting values of properties of the stream such as a network address to be connected to, a remote and local port to be used, a protocol to be used, networking parameters, etc. The Winsock API, the Berkeley sockets API, and other similar APIs are all suitable, when extended or modified as described herein, for use as the API 118.

Figure 2:
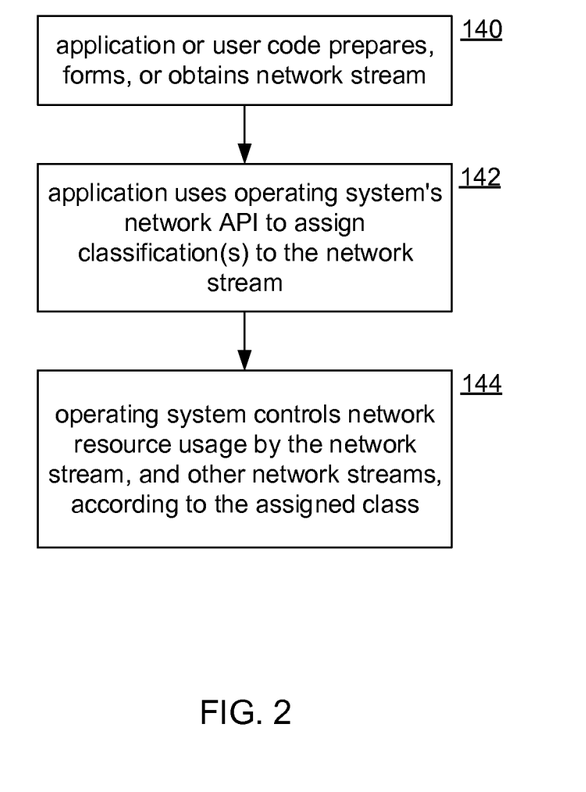
FIG. 2 shows a process of an application using an application programming interface (API).

FIG. 2 shows a process of an application using the API 118 to inform the network stack 104 of a stream class or category to be associated with a specified stream. At step 140, the application forms or obtains a stream. The stream may or may not have a network connection. The stream, in the application's executing code, may be referenced as a descriptor, a handle, object, etc. The application may obtain the stream from another application or process or may initiate the stream as a new object. In the latter case, various parameters or properties of the stream may be set by the application prior to use of the stream to form a network connection. As noted above, such parameters, for example, might be a remote network address, a local network address (when multiple network interfaces 112 are available on the computing device 100 100), local and remote ports, protocol settings, and so forth.

At step 142 the application uses API 118 to assign a stream class or category ("class", hereafter) specifically to the stream. The application may assign other classes to other of the application's streams. Step 142 may be performed at any time during the life of the stream, including when the stream is instantiated, before a network connection is formed for the stream, after the stream is connected and perhaps carrying traffic, when the stream is carrying traffic, etc. Moreover, step 142 may be performed repeatedly on a same stream to change the class that is currently assigned to the stream, thus, as discussed next, correspondingly changing how the stream manager 114 regulates the flow of packets through the stream.

At step 144, the operating system, specifically, the stream manager 114, controls network resource usage by the network stream. The stream manager 114 functions as a central coordinator that orchestrates network behavior of multiple (perhaps all) streams being managed by the operating system. The stream manager 114 may track actual network performance of the streams and regulate their behavior, in particular with respect to latency and bandwidth (throughput) performance, and possibly average throughput over different size time windows. The stream manager 114 may also receive signals about network conditions, for instance by analyzing return trip times (RTTs) of probe packets, by receiving information about queue sizes of various devices along network paths of the streams, etc. Notably, the stream manager 114 should be able to determine recent and/or current bandwidth, latency, or both, for each stream. In one embodiment, not all streams have an explicit application-assigned class. However, the stream manager 114 may also manage these streams, possibly by treating them as having a default class. In one embodiment, the stream manager 114 is not a distinct module or component, but rather is logic dispersed throughout the operating system 102 and/or the network stack 104 (the term "stream manager" as used herein refers to both designs). In other words, the placement of stream management logic is not important.

Figure 3:
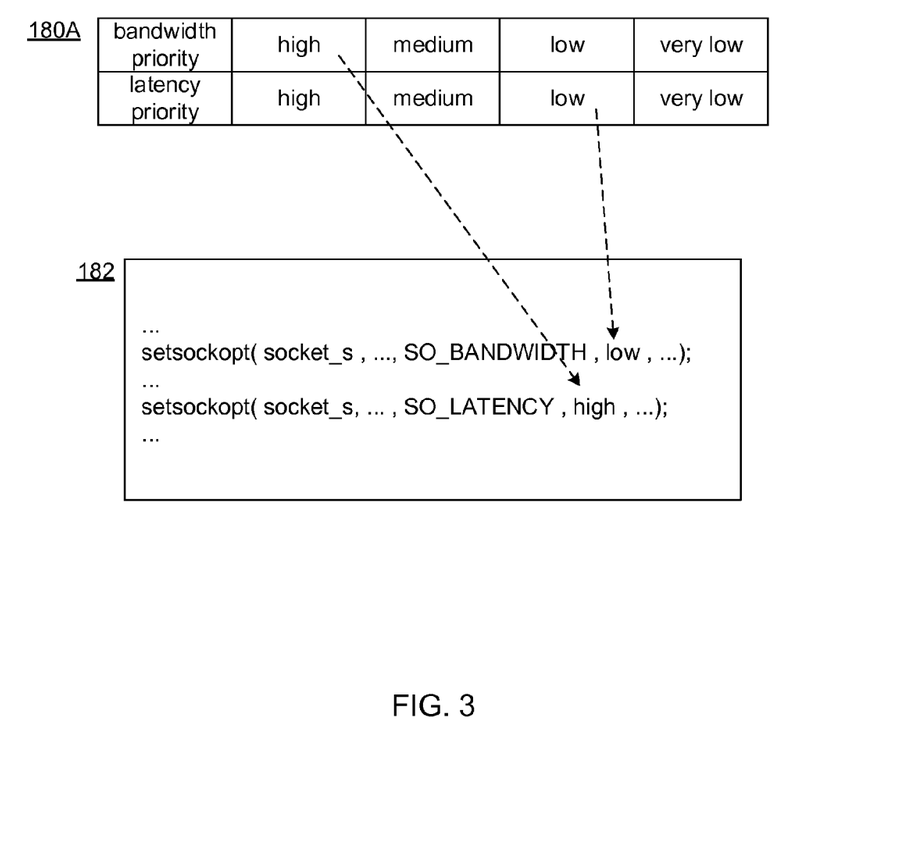
FIG. 3 shows an example of a stream classification model.
Figure 4:
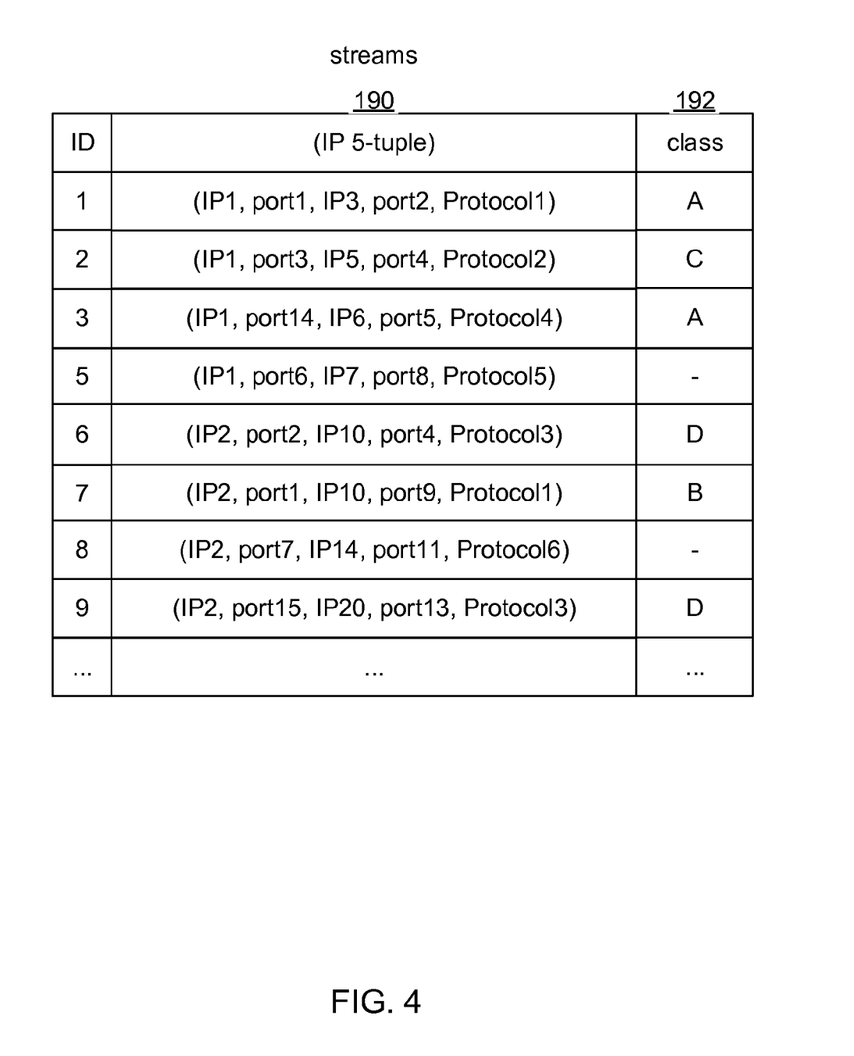
FIG. 4 shows example streams with respective network performance categories.
Figure 5:
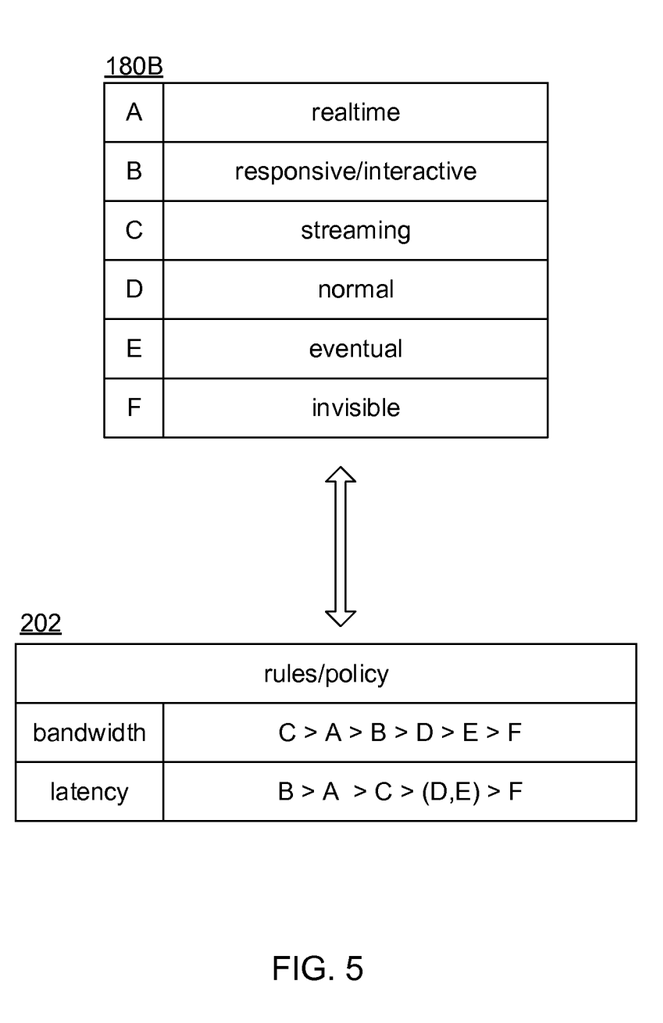
FIG. 5 shows another example of a classification model.

FIG. 3 shows an example of a stream classification model 180A. FIG. 3 also shows a sample of code 182 that assigns a class to a stream. The classification model 180A has eight classes, with four for bandwidth and four for latency. In this example classification model 180A, two classes may be assigned to the same stream; one class for bandwidth and one class for latency. As seen in the sample code 182, a "high" bandwidth and "low" latency classes are assigned to a stream represented by "socket_s". In other embodiments, the classification model 180A might have only bandwidth classes, or only latency classes, or individual classes that have both performance dimensions, as shown in FIG. 5. FIG. 4 shows example streams 190 with respective network performance categories. The streams 190 may have identifiers and classes 192 as assigned through the API 116. In one embodiment, classifications of respective streams are flags or properties of respective data structures or objects that the operating system 102 uses to represent the streams.

FIG. 5 shows another example of a classification model 180B. The classification model 180B has six classes (A to F): a realtime class, a responsive (interactive) class, a streaming class, a normal class, an eventual class, and an invisible class. This classification model 180B may be convenient for developers as the individual classes correspond closely to common types of network-consuming applications. Each class may have, as implemented in logic of the stream manager 114, respective performance ranges, floors, ceilings, etc., in one or more dimensions of network performance. For example, the classes might be implemented as follows (bandwidth in terms of megabits per second (MBS), latency in terms of milliseconds (ms)):
 realtime: 1 MBS, 200 ms,
 responsive: 0.1 MBS, 50 ms,
 streaming: 3 MBS, 1500 ms,
 normal: 0.2 MBS, 5000 ms, and
 eventual, invisible: 0 MBS, 0 ms.
These numbers are only examples; any values may be used, and some classes may have no bandwidth and/or latency specification.

The stream manager 114 may have control logic 200 (FIG. 6) to implement policies or rules 202 for how performance targets of streams, per their classes, are to be achieved when demand creates conflict among the streams. For example, the rules 202 may specify precedence for bandwidth such that when streaming-class streams are at or near their limits bandwidth is made available by throttling other streams according to their classes. For example, when a category-A stream requires networking resources, invisible streams might be throttled first, then eventual, then normal, then responsive. The classes might also have respective weights to specify relative portions of bandwidth (or latency) to be throttled, thus allowing a stream in a higher priority class to obtain a large portion of bandwidth freed from low priority streams and a small portion of bandwidth freed from medium priority streams. In another embodiment, use of network resources is prioritized or apportioned according to the classes of the streams. If a responsive stream requires additional bandwidth, that bandwidth may be drawn (by throttling, for instance) from which ever streams can spare bandwidth while remaining within their performance specifications, perhaps starting from lowest priority class streams. In sum, collective management of network resource consumption by streams according to their classes may be implemented by a wide range of algorithms, rules/priorities, performance values, etc.

A potential benefit of centralized global management of streams according to application-specified classes is that a user's experience may be improved. For example, suppose that a user's device is running a multimedia streaming application with a network stream that has been classified as "streaming". Suppose also that the user starts a web browser application that classifies its HTTP browsing streams as "responsive" and classifies its download streams as "normal". When the user requests a web page, because the corresponding responsive-class stream has higher latency priority than the streaming-class stream, the streaming-class stream may be temporarily throttled (e.g., for 50 ms) to allow the responsive-class stream to meet its latency requirement. The brief slowdown of the streaming-class stream will likely not be noticed by the user (due to buffering), and the web page will download quickly. If the user initiates a file download, bandwidth may be "borrowed" from the streaming-class stream until its bandwidth floor is reached, thus allowing the normal-class download stream to proceed in a way that maximizes its bandwidth without disrupting the playing of media from the streaming-class stream.

Figure 6:
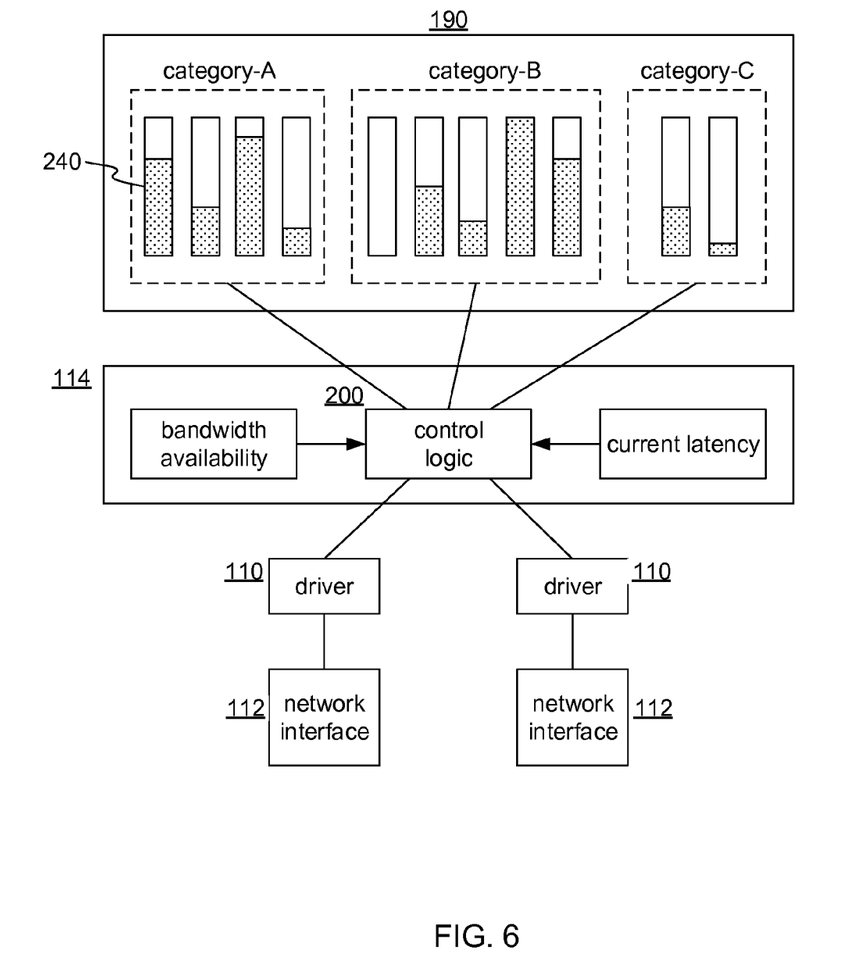
FIG. 6 shows a detailed view of a stream manager.

FIG. 6 shows a detailed view of the stream manager 114. The streams 190 each have a respective queue 240 where packets are queued before being passed through to a device driver for transmission by a corresponding network interface or after being received from a device driver. The control logic 200 manages the network performance of the streams 190 as described above. The control logic 200 may repeatedly receive updates regarding bandwidth and latency. The updates may come from the interface drivers 110, the network stack 104, or external sources. Such updates may indicate a variety of network conditions and statistics such as current bandwidth availability for the computing device 100 or for the individual network interfaces 112, current or projected latency information, network congestion, and so forth. The control logic 200 may use this information to regulate how network resources are consumed by streams.

Figure 7:
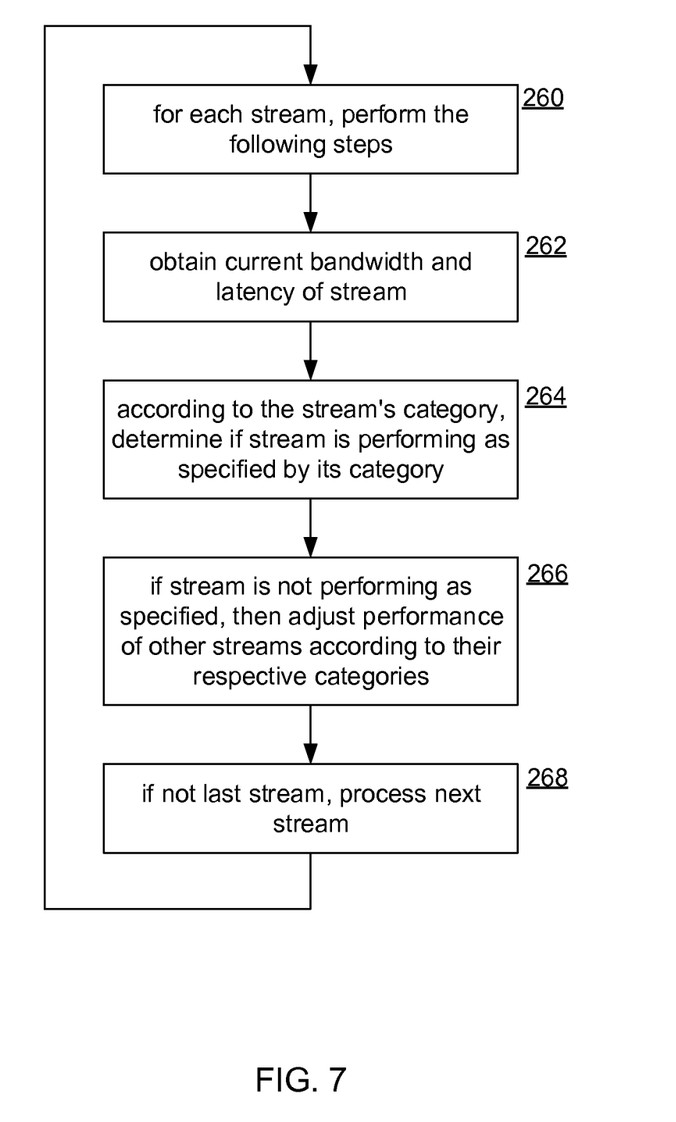
FIG. 7 shows an example process by which the stream manager may regulate streams.

FIG. 7 shows an example process by which the control logic 200 may regulate streams. At a regular interval, the stream manager 114 may, at step 260, begin iterating over the active streams ("stream", in this paragraph, refers to the stream of the current iteration). At step 262 current performance statistics of the stream are obtained. For instance, current or estimated bandwidth and latency are obtained. This information may be estimated from recent throughput, projected according to current traffic statistics, based on the amount of queued packets, the rate of incoming packets, and other known techniques. The class of a stream may affect how often it is iteratively evaluated.

At step 264, the stream manager 114 determines the stream's class or category and determines if the stream is (or is expected to be) performing according to its specified category. At step 266, if the stream is not performing as specified, then the stream manager 114 implements adaptations intended to satisfy the stream's class specifications. For example, taking into account their classes, other streams may be throttled, paused, etc. This may be accomplished by adjusting the receive windows and/or the send windows of streams, expanding or contracting stream buffers, pausing packet flow through a stream, etc. It is not necessary for applications or other components to tag packets, nor is it necessary for applications to use protocol-level QoS features. From the application's perspective, the streams are ordinary TCP (or similar) streams. At step 268 a next stream, if any, is processed.

Regarding mentions herein of streams not performing according to specifications of their respective classes, determinations of performance compliance or determinations that drive performance adjustments should be understood as encompassing more than mere performance relative to other connections on the host machine. Protocols such as the LEDBAT protocol, for example, consider a stream to be not performing as specified if the stream's network connection is experiencing one-way delays that are 100 ms higher than the lowest one-way delay the connection has experienced. The assumption is that the LEDBAT connection might be the factor causing the increased delay, and restricting that connection's windows may decrease delay for other connections going across the same shared network resources. Put another way, specifications of stream classes may be relative respect to each other, absolute with respect to performance values, or combinations of both. In addition, a formal language or syntax may be provided to express complex specifications, for example a syntax of Boolean operators, conditional statements, etc., perhaps in the form of a markup-based (e.g. extensible markup files) declarative language. Or, such complex logic may be "hardcoded" into the programming of the streams manager, the network stack, etc.

Figure 8:
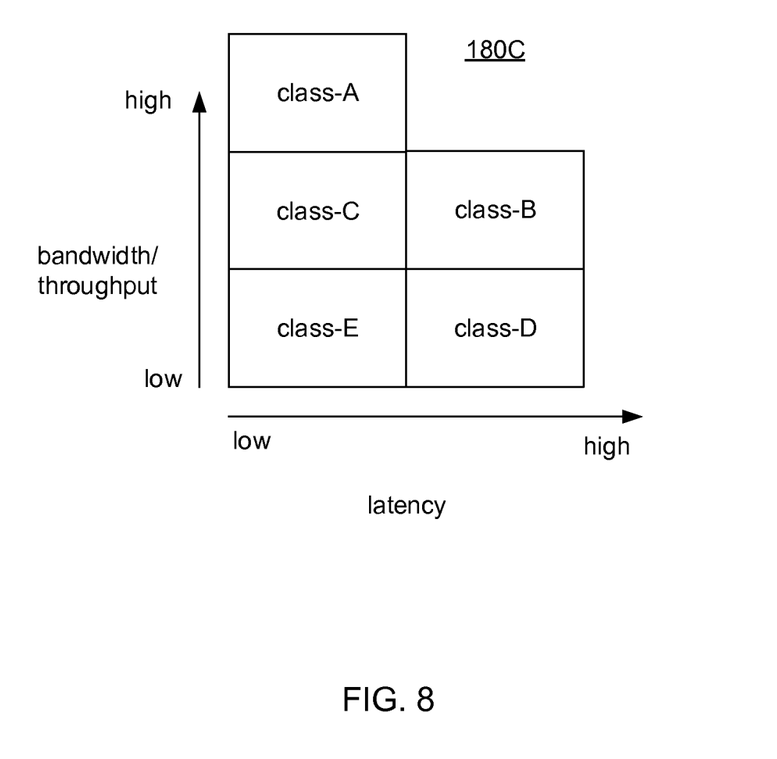
FIG. 8 shows another example of a stream classification model.

FIG. 8 shows another example of a stream classification model 180C. Each category has a latency component and a bandwidth component. Categories may overlap along either dimension. In this example, classification of a stream assigns both a bandwidth and a latency performance target to a stream. If it is assumed that one class, for instance class-E, is intended to impart on corresponding streams a latency specification that corresponds to real-time or rapid responsiveness (i.e., network traffic will begin to flow with minimal apparent delay in response to a user request), then the stream manager logic may use various network-affecting mechanisms of the local operating system to "backoff" or down-regulate other streams, such as class-D streams (or all other streams, or all other active streams, etc.). That is, when a new connection or new traffic begins that is classified as sensitive to latency, low-priority connections can be locally impaired immediately. For example, if a web browser initiated by a user is about to request web objects, background file transfers can pre-emptively be impaired so that upcoming browser traffic starts with a clean network. Prior approaches often rely on quality-of-service decisions that are made based on competing traffic which is usually not immediately helpful for new traffic. A similar approach may be used for bandwidth performance, or for combinations of network performance characteristics. Note that local traffic impairment can be accomplished by pausing the flow of data from applications to their network connections, pausing transmission of buffered packets, adjusting networking window sizes, suspending or downgrading threads that handle stream traffic, or by adjusting other operational parameters of a stream that may potentially affect a stream's consumption of network resources.

Figure 9:
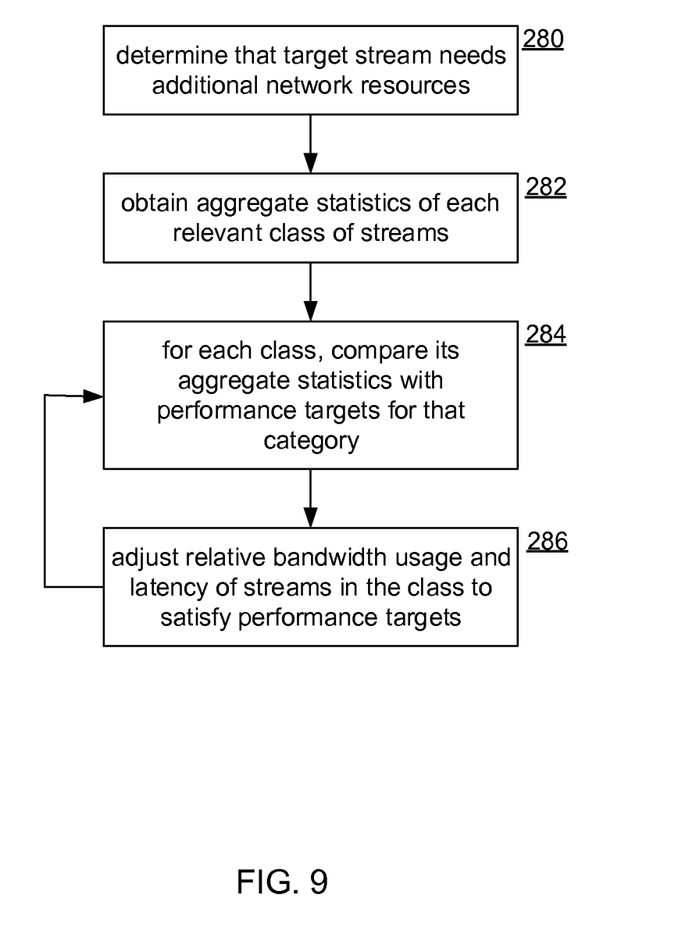
FIG. 9 shows a process for an embodiment of collective stream management.

FIG. 9 shows a process for an embodiment of collective stream management. In this embodiment, the stream manager 114 may effectuate reallocation of network resources as follows. At step 280 it is determined that a target stream needs additional network resources, for instance bandwidth or latency or both, according to its class. For an explanatory example, a class-A stream of classification model 180C will be assumed to need additional bandwidth. At step 282, aggregate statistics are acquired for each class of streams. At step 284, those aggregate statistics are evaluated in class-appropriate order, and at step 286 they are adjusted as needed. The lowest priority class of streams according to the network need is evaluated first, i.e., class-E. If the aggregate bandwidth of class-E streams has, as a whole, extra bandwidth, then class-E streams are throttled to provide additional bandwidth. If the class-E streams have insufficient bandwidth to yield, then the aggregate statistic of the next priority class—class-C—is evaluated. That is, if throttling class-E streams did not free up sufficient bandwidth, the aggregate bandwidth of class-C streams is evaluated and the streams in that class are throttled as needed. If both class-C and class-E streams cannot surrender sufficient bandwidth while meeting their class requirements, then the lower priority class of streams—class-E—may be pushed below their class's bandwidth targets to help satisfy the higher-priority class-A stream's bandwidth requirement.

If the stream in the example above requires improved latency instead of or in addition to added bandwidth, a similar process is performed, but the evaluation of each class's aggregate statistics, and any adjustments to the streams therein, is performed in an order that depends on the latency traits of the classes.

Although this description may in places refer to network resources as being allocated or reallocated, "allocation" of resources is a conceptual characterization of a side effect of using any of a variety of network-affecting mechanisms (described above) to attempt to satisfy the specifications of stream classes. Moreover, prioritization or stream-regulation measures taken based on stream classes may not necessarily involve immediate increases or decreases in consumption of network resources by corresponding streams. For example, protocols such as the LEDBAT protocol (which may be modified to provide stream classes) may not necessarily harm the bandwidth or latency of a low-priority connection when LEDBAT has decided that a low-priority connection needs to be "restricted". For example, reducing the size of a connection's send window may have no immediate impact on its throughput or latency; for many possible reasons the connection may subsequently get better throughput or latency.

Figure 10:
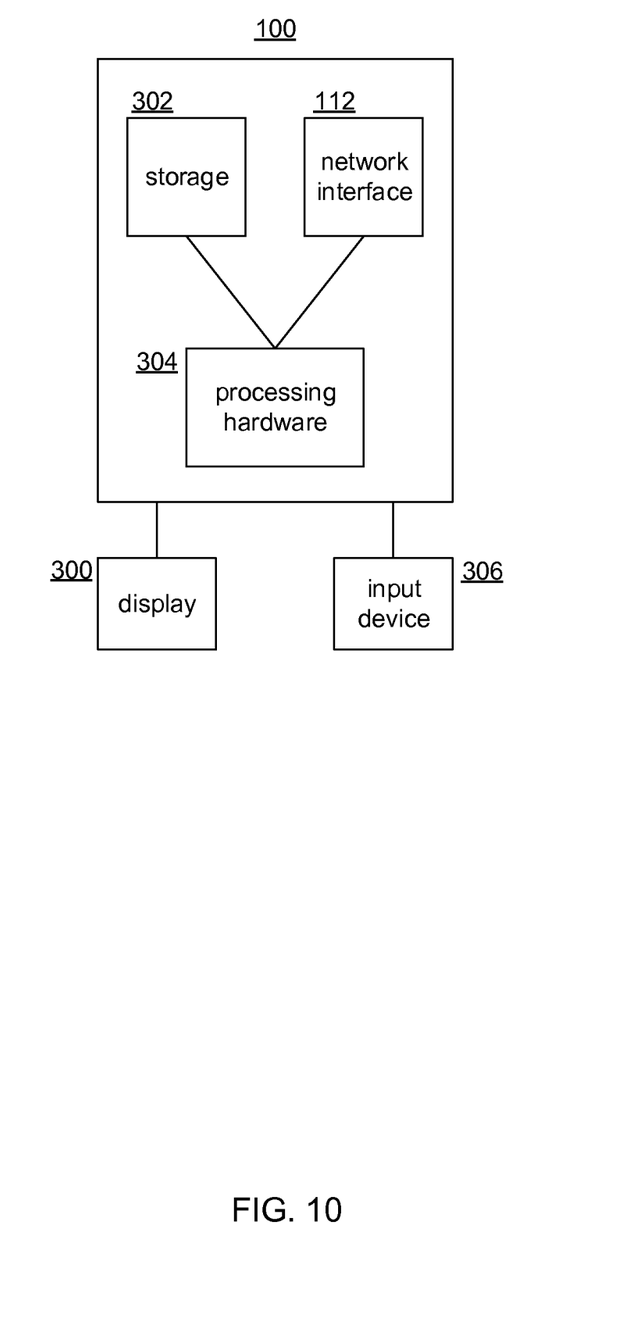
FIG. 10 shows additional details of a computing device.

FIG. 10 shows additional details of the generic computing device 100 on which embodiments described above may be implemented. The computing device 100 may have a display 300 as well as storage 302 and processing hardware 304, which may be a combination of any one or more: central processing units, graphics processing units, analog-to-digital converters, bus chips, Field-programmable Gate Arrays (FPGAs), Application-specific Integrated Circuits (ASICs), Application-specific Standard Products (ASSPs), or Complex Programmable Logic Devices (CPLDs), etc. The storage 302 may be any combination of magnetic storage, static memory, volatile memory, etc. The meaning of the term "storage", as used herein does not refer to signals or energy per se, but rather refers to physical apparatuses (including physical media such as magnetic storage media, optical storage media, static memory devices, etc., but not signals per se). The hardware elements of the computing device 100 may cooperate in ways well understood in the art of computing. In addition, input devices 306 may be integrated with or in communication with the computing device 100. The computing device 100 may have any form factor or may be used in any type of encompassing device. The computing device 100 may be in the form of a handheld device such as a smartphone, a tablet computer, a gaming device, a server, a rack-mounted or backplaned computer-on-a-board, a System-on-a-chip, or others. Generally, the computing device 100 will be a discrete network node or device.

Embodiments and features discussed above can be realized in the form of information stored in volatile or non-volatile computer or device readable apparatuses, with such information able to configure the computing device 100 to perform the embodiments described herein. These apparatuses may include apparatuses such as optical storage (e.g., compact-disk read-only memory (CD-ROM)), magnetic media, holographic storage, flash read-only memory (ROM), or other devices for storing digital information. The stored information can be in the form of machine executable instructions (e.g., compiled executable binary code), source code, bytecode, or other information that can be used to enable or configure computing devices to perform the embodiments described herein. This is also deemed to include at least volatile memory such as random-access memory (RAM) and/or virtual memory storing information such as central processing unit (CPU) instructions during execution of software carrying out an embodiment, as well as non-volatile devices storing information that allows a program or executable to be loaded and executed.

The invention claimed is:
1. A method performed by a computing device comprised of storage, processing hardware, a network interface, and an operating system stored in the storage, the method performed when the operating system is being executed by the processing hardware, the method comprising:
   executing, by the processing hardware, a network module of the operating system that implements a network stream classification model, the network stream classification model comprising a plurality of pre-defined network stream classes implemented by the network module and corresponding to respective different band- width and latency properties, each network stream class having a corresponding network performance specification, respectively, such that some network stream classes have higher priority with respect to the network performance specification than other of the network stream classes;

providing an application programming interface (API) accessible to user-mode code executing on the computing device, wherein applications on the computing device use the API to assign network stream classes to network streams provided by the operating system, thereby determining which network classes are to be associated with which network streams, the network streams for conveying data to/from the applications through the network module of the operating system, wherein an application requests creation of a network stream by communicating with the operating system and assigns a network stream class to the network stream using the API, and wherein associations are maintained to indicate which particular network streams are associated with which particular network stream classes according to the assigning by the applications using the API;

repeatedly receiving, by the network module, updates regarding latency and/or bandwidth performance of the network streams on the computing device;

regulating, by the network module, timing of transmission of packets of the network streams from the computing device according to the updates regarding latency and/or bandwidth performance of the network streams, according to the network performance specifications of the respective network stream classes associated therewith, and according to the relative priorities of the network stream classes with respect to the network performance specifications, wherein timing of transmission of a packet for a network stream depends on which network stream class the maintained associations indicate to be associated with the network stream.

2. A method according to claim 1, wherein an application provides to the operating system, through the API, an identifier of a network stream and an identifier of a network stream class, and in response the operating system stores an association between the network stream and the network stream class, and wherein the regulating of the network stream is performed according to the association between the network stream class and the network stream and according to the network performance specification of the network stream class.

3. A method according to claim 1, wherein an application has a first and a second network stream, and the process further comprises assigning, by the application using the API, a first network stream class to the first network stream and a second network class to the second network stream, wherein the network module adjusts an operational parameter of the first network stream according to the first network stream class, and the network module adjusts an operational parameter of the second network stream according to the second network stream class, the operational parameter used by the computing device to control sending of packets by the computing device.

4. A method according to claim 1, wherein the regulating of a given network stream with an associated given network stream class comprises throttling other of the network streams, wherein the other of the network streams are throttled in an order of priority that corresponds to priorities of the network stream classes relative to each other.

5. A method according to claim 1, wherein the regulating attempts to satisfy the bandwidth and latency performance specifications of the network streams according to which of the network stream classes have been assigned to the network streams.

6. A method according to claim 1, wherein the regulating comprises determining which of the network streams to throttle in order to provide additional bandwidth for a given network stream, wherein the determining is performed according to which network stream classes the determined network streams are associated with.

7. A method according to claim 6, wherein the determining which of the network streams to throttle depends at least in part on which network stream class the given network stream is associated with.

8. A computing device comprising:

processing hardware;

a network interface;

storage hardware storing information to enable the processing hardware, when the computing device is operational, to execute an operating system configured to provide streams and manage execution, by the processing hardware, of arbitrary applications;

the processing hardware, when the computing device is operational, storing definitions of stream classes, each stream class defined to have a different priority, relative to one or more of the other stream classes, wherein the relative priorities prioritize a network performance characteristic among the stream classes such that some stream classes have higher priority with respect to the network performance characteristic than other of the stream classes;

the processing hardware, when the computing device is operational, enabling the arbitrary applications executing on the computing device to assign associations between stream classes identified by the applications and streams identified by the applications, the associations maintained by the computing device, the associations indicating which particular streams are associated with which particular stream classes according to the associations assigned by the applications; and the processing hardware, when the computing device is operational, controlling use of network resources of the computing device by the streams according to the respective stream classes assigned thereto according to the maintained associations, the controlling performed by the operating system and comprising, for a stream class, computing an aggregate network performance statistic for the streams associated therewith according to the maintained associations, and controlling the timing of transmission of packets for the streams of the stream class according to the aggregate network performance statistic and according to the relative priorities of the stream classes with respect to the network performance characteristic, wherein timing of transmission of a packet for a stream depends on which stream class the maintained associations indicate to be associated with the stream.

9. A computing device according to claim 8, wherein transmission of packets of a stream by the network interface is preemptively restricted based (i) on an event associated with another stream and based (ii) on a stream class of either the stream and/or the other stream.

10. A computing device according to claim 9, the event comprising formation of a network connection for the other stream or an occurrence of network traffic on the other stream.

11. A computing device according to claim 8, wherein regulating actions are performed for the streams in an order corresponding to the relative priorities of the stream classes corresponding to the streams.

12. A computing device according to claim 8, wherein the operating system provides an application programming interface that the applications use to assign the stream classes to the streams by providing, through the application programming interface, identifiers of the stream classes and identifiers of the streams.

13. A computing device according to claim 8, wherein timings and/or amounts of transmission of the streams by the network interface are prioritized according to the network classes assigned thereto.

14. A computing device according to claim 13, wherein performance of the streams, with respect to the performance characteristic, is evaluated according to the stream classes assigned thereto, and when it is determined that a stream is not performing, or will not be performing, according to the stream class assigned thereto, other streams are regulated according to the stream classes assigned thereto.

15. One or more storage apparatuses storing information to enable a computing device, when operating, to perform a process, the process comprising:
executing an operating system that provides network streams to applications being executed by the operating system, the operating system implementing predefined network stream classes, the network streams comprising operating system objects that the applications write to send data to a network and read from to receive data from the network, wherein stored definitions define the network stream classes, each network stream class defined to have a different priority, relative to one or more of the other network stream classes, wherein the relative priorities prioritize a network performance characteristic among the stream classes such that some network stream classes have higher priority with respect to the network performance characteristic than other of the network stream classes;
executing a network stack of the operating system that implements a network communication protocol, wherein the streams of the applications send and receive network packets through the network stack, the packets compliant with the network communication protocol;
providing an application programming interface (API) to the operating system, wherein the API, when used by an application, allows the application to assign a stream class to a stream by specifying to the API the stream, the network stream class, and an association between the specified stream and the specified network stream class, wherein the network stack maintains association information indicating which of the streams have been assigned to which of the network stream classes according to invocations of the API by the applications to assign the streams to the network stream classes; and
controlling timing of sending of the packets of the streams from the computing device according to a network statistic of the streams, according to the network stream classes assigned thereto according to the maintained association information, and according to the relative priorities of the network stream classes with respect to the network performance characteristic, wherein timing of transmission of a packet for a stream depends on which network stream class the maintained association information indicates to be associated with the stream.

16. One or more storage apparatuses according to claim 15, wherein the network communication protocol comprises a transmission control protocol at a network transport layer.

17. One or more storage apparatuses according to claim 15, wherein the operating system evaluates network performance of the streams according to the network stream classes assigned thereto and adjusts operational parameters of the streams according to the evaluating, wherein adjustment of an operational parameter of a given stream depends on which network stream class has been assigned to the given stream.

18. One or more storage apparatuses according to claim 15, wherein each network stream class corresponds to a respective bandwidth and latency specification, and the evaluating comprises evaluating bandwidth and latency performance of the streams against the bandwidth and latency specifications of the network stream classes.

19. One or more storage apparatuses according to claim 15, wherein packets of the streams, when transmitted from the computing device, do not comprise quality of service tags.

20. One or more storage apparatuses according to claim 15, wherein a network stream class corresponds to a performance floor or ceiling and an operational parameter of a stream is adjusted based on the performance floor or ceiling.

* * * * *